United States Patent [19]

Golino

[11] Patent Number: 4,940,613

[45] Date of Patent: Jul. 10, 1990

[54] PROTECTIVE COATINGS FOR GLASS AND CERAMIC VESSELS

[75] Inventor: Carlo M. Golino, Corning, N.Y.

[73] Assignee: Corning Incorporated, Corning, N.Y.

[21] Appl. No.: 315,602

[22] Filed: Feb. 27, 1989

[51] Int. Cl.⁵ .................. B32B 17/06; B32B 17/10
[52] U.S. Cl. ............................ 428/34.7; 215/12.1;
    215/12.2; 215/DIG. 6; 428/34.4; 428/34.6;
    428/195; 428/198; 428/210; 428/334; 428/415;
    428/426; 428/441; 428/442
[58] Field of Search ............... 428/34.4, 34.6, 34.7,
    428/195, 198, 426, 441, 500, 522, 210, 334, 415,
    442; 215/12.1, 12.2, DIG. 6

[56] References Cited

U.S. PATENT DOCUMENTS

| | | | |
|---|---|---|---|
| 3,912,100 | 10/1975 | Graham et al. | 215/12.2 |
| 3,922,450 | 11/1975 | Stengle, Jr. | 428/441 |
| 3,955,020 | 5/1976 | Cavanagh et al. | 428/195 |
| 4,053,076 | 10/1977 | Vogel et al. | 428/34.7 |
| 4,056,208 | 11/1977 | Prejean | 428/522 |
| 4,129,225 | 12/1978 | Bailey | 215/12.2 |

Primary Examiner—Thurman K. Page
Assistant Examiner—Archene A. Turner
Attorney, Agent, or Firm—Clinton S. Janes, Jr.

[57] ABSTRACT

This invention relates to glass, glass-ceramic, and/or ceramic vessels which are coated with an organic polymer to reduce breakage and to protect the user from flying fragments when the vessels are broken upon impact. The invention contemplates strongly bonding the organic polymer in a small area around the mouth of the vessel only.

10 Claims, No Drawings

PROTECTIVE COATINGS FOR GLASS AND CERAMIC VESSELS

BACKGROUND OF THE INVENTION

The present invention relates to glass and ceramic vessels and, more explicitly to glass and ceramic vessels which are coated with an organic polymer to improve the mechanical strength (resistance to breakage upon impact) of the vessel and to minimize scattering of fragments should the vessel be fractured.

Glass vessels, such as glass bottles and laboratory glassware, have long been used as containers for various foodstuffs and as receptacles for use in laboratory apparatus inasmuch as they are superior in manY respects to vessels fabricated from other materials. Two recognized drawbacks to the glass vessel, however, are its susceptibility to fracture upon impact and its tendency to shatter upon fracture to produce sharp glass shards. The inherent susceptibility of glass to fracture is heightened by the development of scratches and pits in the surface thereof resulting from mechanical abrasions and/or chemical attack encountered during use. The safety hazard involved in the breakages of glass vessels is magnified in those applications where the contents of the vessel are under pressure, e.g., bottles containing carbonated beverages, inasmuch as the shards resulting from such breakage will be scattered with great force over a relatively wide area.

It was found that breakage of glass vessels and the scattering of glass shards therefrom could be significantly reduced by applying a coating of an organic polymer onto the vessels. Furthermore, the coating protected the surface of the vessel from surface abrasions and chemical attack; hence, substantially extending the useful life thereof.

Various methods have been devised for applying such coatings. For example, a coating or film of a liquid organic polymeric material can be applied through such conventional processes as dipping, painting, or spraying; which coating or film is cured through such well known practices as simple air drying, defined heat treatments, and exposures to ultraviolet or other actinic radiation. Sheaths or sleeves of heat-shrinkable thermoplastic materials have been applied to bottles and the so-coated bottles then heated to shrink the sheaths or sleeves around the bottles in a snug-fitting relationship. As can be appreciated, combinations of those two general methods have been utilized.

Devising protective coatings for laboratory glassware has been particularly critical inasmuch as the breakage of glass vessels containing corrosive or toxic liquids is a major safety problem. One process which is widely practiced commercially contemplates coating the vessel by heating to a temperature of about 300° C., dipping into a fluidized bed filled with powder of a suitable thermoplastic polymer, e.g., plasticized polyvinyl chloride (PVC) or ethylene-vinyl acetate copolymer, and thereafter withdrawing from the fluidized bed. The powder sticks to the hot glass surface and then flows to form a clear, coherent, continuous coating. In general, coatings have been prepared by that process having thicknesses of about 0.008"–0.105" (0.2–2.7 mm).

Such coatings can be applied either to an untreated glass surface, in which case the bond between the glass and the coating is relatively weak, or it can be applied to a glass surface which has been treated with a chemical primer which reacts stronglY (during the powder fusion step) with both the glass and the applied polymer powder coating.

Strong adhesion of the thermoplastic coating to the glass surface imparts at least the four following advantages when compared to coatings where the bond between the polymer and the glass is weak:

First, it improves the durability of the coating, i.e., it reduces the tendency of the coating to part from the glass surface, when the vessel is subjected to mechanical abuse or to such activities as dishwashing and autoclaving;

Second, a strongly adhered coating improves the overall mechanical strength of the glass vessel making it more resistant to breakage by impact;

Third, a strongly adhered coating is much less likely to trap liquids in the interfacial area between the glass and the polymer skin; and Fourth, a strongly adhered coating is much less likelY to be removed inadvertently by users who "pick" at it while using the coated vessel.

Nevertheless, strong adherence of the coating does impart one recognized serious disadvantage; viz., it reduces the ability of the polYmer skin to contain the broken glass shards and liquid contents when the vessel is fractured. Thus, experience has shown that this reduction in containment ability is due to the fact that a strongly adhered coating is much more likely to be cut by the attached glass shards. Stated in another way, because the polymer coating is strongly bonded to the glass surface, the shards resulting from the impact fracture penetrate through the coating, thereby dramatically reducing the tear strength of the polymer.

Accordingly, the primary objective of the present invention was to devise polymer coatings for glass and ceramic vessels which would preferably be transparent, which would preferably resist the development of haze and/or discoloration; which would resist delamination, i.e., separation from the vessel surface when subjected to washing and exposure to an autoclave atmosphere; which would prevent the trapping of liquids in the interfacial area between the vessel surface and the polymer skin; and which, upon fracture of the glass or ceramic, would contain the resultant fragments and any liquid contents therein. Stated more simply, the primary objective of the present invention was to develop polymer coatings for glass and ceramic vessels which would demonstrate the several advantages of strongly adhered coatings described above, while concurrently exhibiting dramatic improvement in retaining broken fragments, and, hence, in retaining liquids within glass vessels upon breakage thereof.

SUMMARY OF THE INVENTION

I have found that objective can be achieved by strongly bonding the polymer coating to the vessel at a small selected area(s) onlY of its surface. Hence, a small area only of the vessel is treated with a chemical primer which reacts strongly with both the vessel material and the coating such that, upon contacting the vessel with the polymer coating, only in the area treated with primer will the coating by strongly adhered; i.e., in the untreated areas of the vessel the bond between the coating and the vessel surface will be relatively weak. The small area of strong bonding seals the polymer to the vessel surface, thereby resisting delamination and preventing entrapment of liquids in the interfacial region between the polymer coating and the vessel surface. The relatively weak bond existing between the polymer coating and the vessel surface over the remainder of the vessel permits the coating to "give" such that, upon breakage of the vessel, the shards resulting therefrom are much less likely to pierce the coating. Thus, the shards release from the coating prior to cutting it.

Whereas the positioning of the primer treated area(s) on the vessel is a matter of individual choice, I believe the most beneficial and practical area is closely adjacent to and encircling the mouth of the vessel. For example, in the case of a laboratory Erlenmeyer flask, primer will be applied around the neck contiguous to the mouth thereof. Such placement strongly seals the after-applied polymer coating to the glass in that area, thereby preventing the flow of liquid down between the glass and the coating should some be spilled in pouring. Likewise, in the case of such consumer items as drinkware, pitchers, and bottles, positioning the sealed area adjacent to the rim thereof is believed to afford the greatest advantage.

With respect to the extent of the area to which the chemical primer is applied, at least four forces are at work:

First, the subsequent area of seal must be sufficiently large to resist delamination of the coating through mechanical abuse and chemical attack (it must resist inadvertent removal by users who "pick" at it while using the vessel);

Second, the region of primer should not be so great that it becomes a significant area for shard penetration;

Third, because of increased physical stresses impressed by users upon the coatings applied to larger vessels, the area of primer will typically be greater in the case of larger vessels; and Fourth, primers are costly such that commercial economics dictate that their use be restricted to that amount necessary to accomplish the desired result.

Based upon the above parameters, I have found that a region of primer surrounding the mouth of a vessel having a breadth of at least about 1% of the total height of the vessel must be applied. For example, with a flask having a height of 10" ($\approx$25.4 cm), a primed circle extending downwardly at least 0.1" ($\approx$2.54 mm), preferably at least 0.15" ($\approx$3.8 mm) from the mouth will be employed. With much larger vessels, e.g., 3.5 gallon carboys, a ring of primer encircling the mouth thereof having a breadth of about 10% of the height may be practical. Therefore, although, as was noted above, much greater areas of primer may be utilized, I have considered a zone surrounding the mouth of a vessel having a breadth of about 1-10% of the height of the vessel to be quite effective. More expansive regions not only do not produce improved performance, but also are economically indefensible and can provide significant areas for shard penetration should the vessel be broken.

DESCRIPTION OF PREFERRED EMBODIMENTS

EXAMPLE I

A zone around the outside of the neck and just below the rim of several PYREX ® 100 ml volumetric flasks formed from a borosilicate glass marketed by Corning Glass Works, Corning, N.Y., under the designation Corning Code 5640 was coated by dipping, painting, or spraying with Thermoclad clear glass vinyl primer, Lot 3519, marketed by The Thermoclad Company of Erie, Pa. an epoxy primer which was dissolved in a toluene/methyl ethyl ketone solvent in an amount of 6% epoxy solids. After the solution dried on the glass surface, the flasks were heated to about 300° C., dipped into a fluidized bed filled with plasticized PVC (Morton VCA 1569 Clear 2638, marketed by Morton Thiokol, Inc., Morton Chemical Division, of Reading, Pa.) for typically about 2-3 seconds, removed from the fluidized bed for typically about 5-10 seconds, and that process repeated until a predetermined thickness of coating is achieved. Experience has indicated that each dipping adds about 0.010" ($\approx$0.25 mm) of PVC coating. In some instances the so-coated articles were subjected to a post heat treatment for about 15-30 seconds at a temperature of about 250°-300° C. to complete the flow of the final PVC coat to produce a smooth surface thereon.

The height of the flasks was about 6.5" ($\approx$16.5 cm) and the width of primer-coated zones ranged between 0.12"-0.5" ($\approx$3-12.7 mm), i.e, between about 1.8-7.7% of the height of the flask. PVC coating thicknesses varied between about 0.010"-0.060" ($\approx$0.25-15 mm).

A number of coated flasks were introduced into a steam autoclave and subjected therein for 15 minutes to a temperature of 250° F. ($\approx$121° C.) and a steam pressure of about one atmosphere. The autoclave was then allowed to cool to 0 psig, the flask withdrawn therefrom, and dried at 115° C. for 10 minutes. That cycle of autoclaving followed by drying was carried out 20 times. At the conclusion of those cycles the primed zones were still strongly adhered to the glass. Also, quite surprisingly, there was no evidence of gases trapped between the glass surface and the PVC coated areas which had not been primed. There was considerable concern that trapped gases would puff out the PVC coating when the flasks were steam treated in the autoclave and/or subsequently dried at elevated temperature. Some haze was observed in the PVC coating when the flasks were withdrawn from the autoclave, but which completely disappeared upon drying.

A number of coated flasks were introduced into a commercial dishwasher and subjected to ten washing cycles using a commercial detergent. No significant adverse effect upon the adhesion of the coating to the glass in the primed zone was noted, nor was there any substantial evidence that the PVC coating was puffed out.

To test the containment capability of the coated flasks, they were essentially filled with water, rubber stoppers forced into the mouths thereof, and the flasks then dropped from a height of 42" ($\approx$1.1 m) onto an asphalt tile-over-concrete floor. It was found that, when a coating having a thickness of about 0.015" ($\approx$0.38 mm) was applied, most of the flasks survived, and where breakage occurred, the glass fragments and liquid were totally contained. Moreover, upon raising the drop height such that breakage of all of the samples occurred, essentially 100% of the glass was contained by the polymer coating with very little leakage of water.

In sharp contrast, when flasks having their entire outside surfaces initially primed and the PVC coating applied thereto in accordance with the above description were broken, numerous cuts were observed in the PVC coating, loose glass shards were found, and most of the water escaped.

EXAMPLE II

Several of the PYRE® 100 ml volumetric flasks referred to in Example I were treated in accordance with the procedure described in Example I except that the zone around the neck of the flasks was initially coated with Morton Primer, Lot 63 pd 100, an epoxy primer which was dissolved into methyl ethyl ketone to yield a 1:1 by weight solution. Thereafter, PVC coatings of varying thickness were then applied.

Strong bonding was observed in the initially primed zone and that adhesion was not lost during the described autoclaving and dishwashing procedures.

When tested for containment upon breakage, essentially 100% of the glass fragments remained enclosed and water leakage was very minimal.

As can be appreciated, there is no express thickness limit in the polymer coating applied. In general, the larger the vessel and, hence, the greater the wall thickness of the vessel, the thicker will be the coating required to effectively retain the broken fragments and any liquid held by the vessel. Nevertheless, laboratory experience has indicated that thicknesses greater than about 0.1" ($\approx$2.54 mm) are not necessary and are wasteful from an economic point of view. A range of thicknesses between about 0.015"–0.060" ($\approx$0.38–1.5 mm) is preferred.

Whereas in the above Examples the neck area of the flask was initially treated with primer and the polymer coating applied subsequently, that sequence of steps is not demanded. To illustrate, the flask could be initially coated with an organic polymer, e.g., PVC, the upper edge thereof trimmed, and a small amount of primer inserted between the top edge of the coating and the surface of the flask. The vessel is then subjected to a heat treatment to bond the primer to both the glass and the polymer coating. That practice has the advantage that the vessel is not primed until it has been successfully coated with the organic polymer. That circumstance permits easy reclaiming of ware with defective coatings (primed ware is very difficult to strip after coating). In a variation of that technique, a primer can be employed which does not require a heat treatment to promote bonding, e.g., exposure to ultraviolet radiation.

Whereas the above specific Examples involved borosilicate glass (PYREX®) laboratory glassware, it will be appreciated that the present invention is equally applicable to soda lime glass consumer ware such as bottles, drinkware, and pouring pitchers. The addition of conventional tints and/or pigments to the coatings for decoration, identification means, etc. is well-recognized in the art. Likewise, whereas the preferred coatings will be transparent, that feature is not necessarY Finally, although the preferred embodiments of the invention has been described in terms of glass vessels, the present invention is not limited to such; but is equally effective with glass-ceramic and ceramic vessels which, in like manner to glass, demonstrate brittle breakage with accompanying sharp fragments.

I claim:

1. In a vessel composed of a material demonstrating a brittle fracture selected from the group consisting of glass, glass-ceramic, and ceramic, said vessel being coated with an organic polymer to reduce breakage and to contain fragments of said material upon fracture of said vessel and any liquid present in said vessel, the improvement wherein said organic polymer is bonded to said vessel at a small selected area only through a chemical primer which reacts with both said organic polymer and the material of said vessel at said selected area, the breadth of said selective area being sufficient such that the bond developed by said chemical primer between the material of said vessel and said organic polymer at said selected area is sufficiently strong to resist delamination and prevent entrapment of liquids in the interfacial region between said organic polymer coating and the surface of said vessel, but the breadth of said selected area not being so great as to become a significant area for shard penetration, wherein said selective area has a breadth of at least about 1% of the total height of said vessel.

2. A vessel according to claim 1 wherein said selected area is closely adjacent to and encircling the mouth of said vessel.

3. A vessel according to claim 2 wherein said selected area has a breadth of about 1–10% of the height of said vessel.

4. A vessel according to claim 1 wherein said chemical primer is an epoxy compound.

5. A vessel according to claim 1 wherein said organic polymer is plasticized polyvinyl chloride.

6. A vessel according to claim 1 wherein said vessel consists of a glass selected from the group consisting of a borosilicate glass and a soda lime glass.

7. A vessel according to claim 1 wherein said organic polymer coating has a thickness of at least 0.010" ($\approx$0.25 mm).

8. A vessel according to claim 7 wherein said organic polymer coating has a thickness about 0.010"–0.1"($\approx$0.25–2.54 mm).

9. A vessel according to claim 1 wherein said organic polymer coating is transparent.

10. A vessel according to claim 1 wherein said organic polymer contains a material selected from the group consisting of a tint and pigments.

* * * * *